United States Patent [19]

Amano et al.

[11] Patent Number: 5,074,257

[45] Date of Patent: Dec. 24, 1991

[54] AIR INTAKE DEVICE FOR AN ENGINE

[75] Inventors: Junkichi Amano; Masashi Murakami, both of Iwata, Japan

[73] Assignee: Yamaha Hatsudoki Kabushiki Kaisha, Iwata, Japan

[21] Appl. No.: 554,257

[22] Filed: Jul. 17, 1990

[30] Foreign Application Priority Data

Jul. 21, 1989 [JP] Japan .................................. 1-190147
Sep. 27, 1989 [JP] Japan .................................. 1-253178

[51] Int. Cl.$^5$ ........................................... F02M 35/10
[52] U.S. Cl. ............................................. 123/52 MB
[58] Field of Search ........ 123/52 M, 52 MV, 52 MC, 123/52 MB

[56] References Cited

U.S. PATENT DOCUMENTS

| | | | |
|---|---|---|---|
| 4,619,226 | 10/1986 | Ueda et al. | 123/52 MC |
| 4,643,136 | 2/1987 | Ura et al. | 123/52 M |
| 4,907,547 | 3/1990 | Daly | 123/52 M |
| 4,919,086 | 4/1990 | Shillington | 123/52 MC |
| 4,932,369 | 6/1990 | Parr | 123/52 MB |
| 4,945,865 | 8/1990 | Lee | 123/52 M |

FOREIGN PATENT DOCUMENTS

253305 4/1967 Fed. Rep. of Germany ........ 123/52 MV

*Primary Examiner*—David A. Okonsky
*Attorney, Agent, or Firm*—Ernest A. Beutler

[57] ABSTRACT

A number of embodiments of compact high efficiency induction systems for an internal combustion engine. In each embodiment, the induction system includes a first pipe section that extends from the respective intake passage of the engine and which terminates in a downwardly turned right angle section. A U shaped pipe section is interconnected at one end to this right angle section and its other end is served by a plenum chamber that is integrally formed with the first pipe section. In some embodiments, the plenum chamber lies at least in part over the first pipe section and in other embodiments it is forwardly of it. In some embodiments, the U shaped pipe section is detachably connected to the plenum chamber, first pipe section assembly so as to permit attachment of different length sections for tuning for different engines.

44 Claims, 8 Drawing Sheets

AIR INTAKE DEVICE FOR AN ENGINE

BACKGROUND OF THE INVENTION

This invention relates to an air intake device for an engine and more particularly to an improved high efficiency and compact induction system for an engine.

It is well known that the efficiency of the induction system of an internal combustion engine can be significantly improved by tuning the length of the intake passages which serve the individual intake ports. Also, it is known that the induction system efficiency can be improved by providing a common plenum chamber that serves all of the intake passages or at least groups of them so as to reduce cylinder to cylinder variations. However, the provision of tuned intake passages and a plenum chamber can give rise to obvious spatial difficulties. This problem is particularly acute in motor vehicle applications wherein the engine compartment tends to be very compact due to the number of accessories and ancillary components of the vehicle which are mounted therein. Also, the induction system should be arranged in such a way so that there will be adequate air flow across the induction system so that the induction system does not become heated and reduce the volumetric efficiency of the engine. Previously proposed induction systems have not been fully capable of meeting all of these requirements.

For example, it has been proposed to provide a serpentine shaped intake passage for each intake port so as to increase the length of the intake passages. Such an arrangement, however has necessitated the wrapping of the intake passages around the plenum chamber and thus preventing its adequate cooling.

It is, therefore, a principal object of this invention to provide an improved, compact, high efficiency induction system for an engine.

It is a further object of this invention to provide an induction system for an engine in which long intake runners can be employed along with a plenum chamber and yet a compact and adequately cooled construction results.

In addition to the difficulties aforenoted, the complex configurations of previously proposed induction systems have made them very expensive to manufacture. It is, therefore, a still further object of this invention to provide an improved induction system for an engine that can be easily and inexpensively manufactured.

In connection with the tuning of the intake system, frequently it may become desirable to tune a given engine in a different manner by changing the length of the intake passages. With previously proposed constructions, this has necessitated the complete replacement of the entire induction system.

It is, therefore, a still further object of this invention to provide an improved, compact, efficient induction system wherein the length of the intake passages can be easily changed to suit particular applications.

As has been previously noted, the engine compartment frequently contains a number of accessories and ancillary components not only for the engine, but also for the associated motor vehicle. Frequently, many of these accessories must be driven from the engine and this further complicates the positioning and design of the induction system.

It is, therefore, a still further object of this invention to provide an improved, high efficiency induction system for an engine that is compact and which yet will afford adequate space for accessories driven by the engine.

SUMMARY OF THE INVENTION

This invention is adapted to be embodied in an induction system for an engine having a plurality of aligned intake ports facing in a first direction. The induction system is comprised of a plurality of first pipe sections extending from the respective intake port outwardly and terminating in a generally right angle portion. A plurality of second pipe sections having a generally U shaped configuration are each connected at one end thereof to the right angle portion of a respective of the first pipe sections. A common plenum chamber is connected to and communicates with the other end of each of the first pipe sections for supplying intake air to each of the intake ports.

DETAILED DESCRIPTION OF THE PREFERRED EMBODIMENTS OF THE INVENTION

Figure 1:
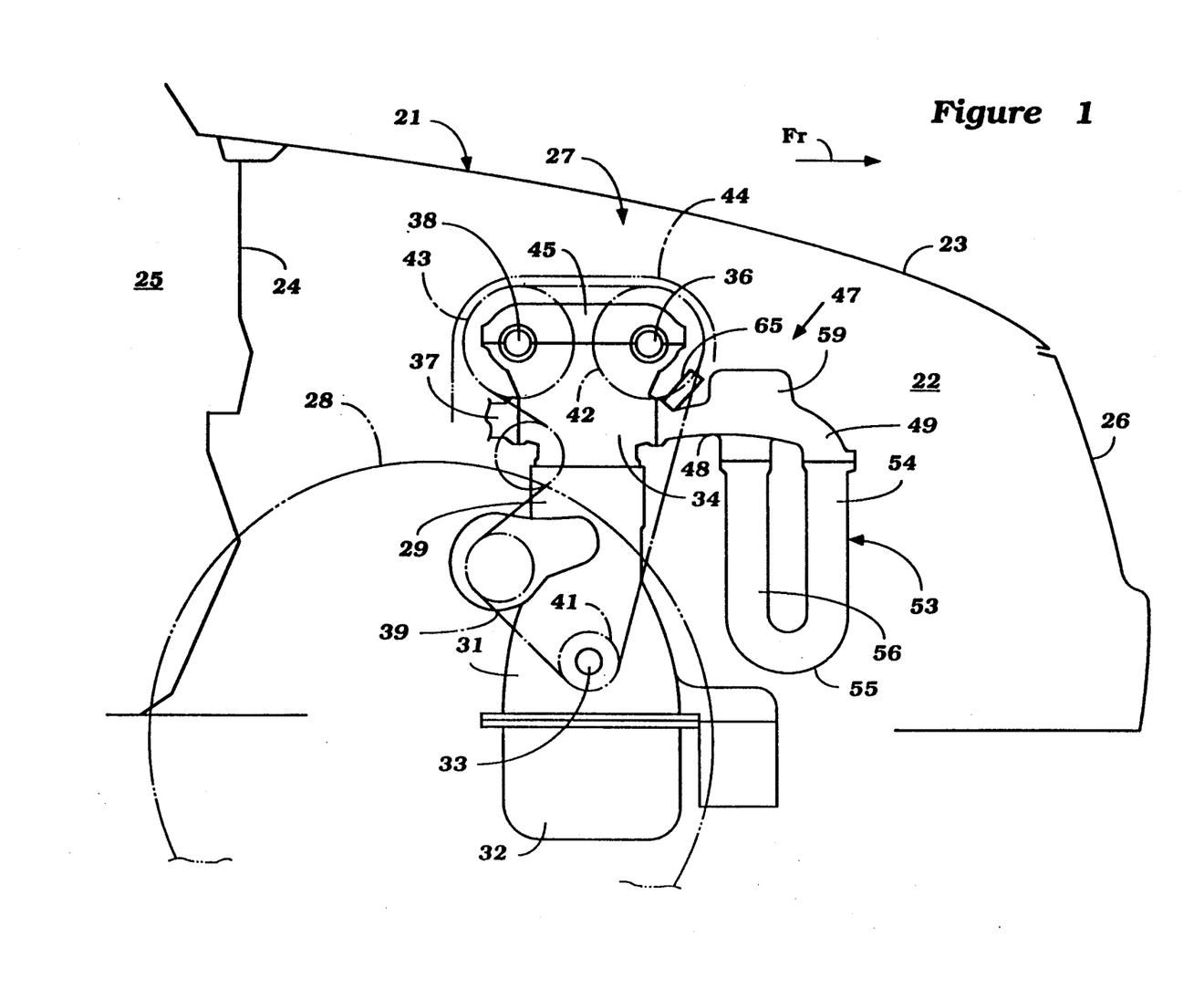
FIG. 1 is a side elevational view of a motor vehicle powered by an internal combustion engine having an induction system constructed in accordance with a first embodiment of the invention with portions removed to more clearly show the construction of the engine and its orientation in the engine compartment.

Referring in detail first to FIG. 1, a motor vehicle is shown, partially and is identified generally by the reference numeral 21. The invention is described in conjunction with a motor vehicle because it has particular utility in such applications, particularly those in which the engine is positioned transversely in the engine compartment. Of course, it will be understood by those skilled in the art that the invention and certain facets of it may be utilized in conjunction with other applications for internal combustion engines.

The motor vehicle 21 has an engine compartment 22 that is defined in part by a forwardly sloping hood 23 and fire wall 24 which separates the engine compartment 22 from a passenger compartment 25. In the illustrated embodiment, the engine compartment 22 is positioned at the front of the vehicle and since the invention deals with the engine and its placement in the engine compartment, only this portion of the vehicle has been illustrated. It is to be understood, however, that the invention also has utility in conjunction with other engine placements such as mid or rear engine.

A grill opening 26 is provided at the front of the vehicle 21 for admitting cooling air to the engine compartment 22 and a radiator (not shown) contained therein. Mounted to the rear of this radiator is an internal combustion engine, indicated generally by the reference numeral 27 and constructed in accordance with an embodiment of the invention. The engine 27 is comprised of a four cylinder in line type, although the invention also has utility in conjunction with other cylinder numbers and other configurations. Also, the invention can be utilized in conjunction with non-reciprocating types of engines. The engine 27 drives a pair of front wheels 28 through a suitable transmission and final drive mechanism (not shown).

The engine 27 includes a cylinder block 29 having four aligned cylinder bores and terminates in a crankcase portion 31 at its lower end. An oil pan 32 is affixed to the crankcase portion 31 and the crankshaft of the engine, shown partially at 33, is journaled within this crankcase chamber.

A cylinder head 34 is affixed to the cylinder block 29 in a known manner and has a plurality of forwardly facing intake ports 35 (FIG. 2) which are generally aligned. There may be one or more intake ports 35 for each cylinder of the engine. Intake valves (not shown) are provided at the ends of the intake ports 35 and are operated by means of an overhead mounted camshaft 36 in a well known manner.

The engine 27 also has rearwardly facing exhaust ports (not shown) to which an exhaust manifold 37 is affixed for discharging the exhaust gases to the atmosphere. An exhaust camshaft 38 operates the valves associated with these exhaust ports.

Figure 2:
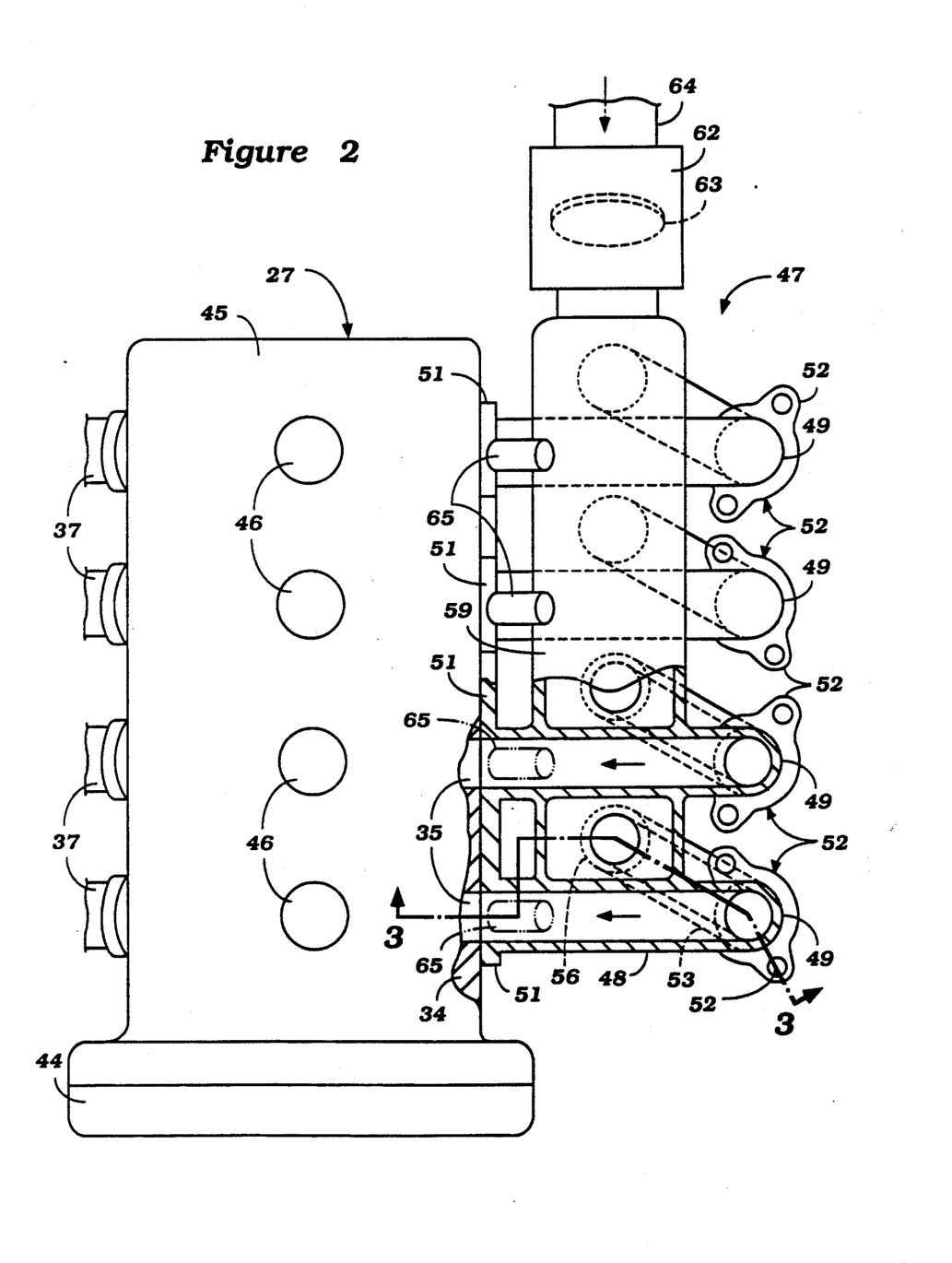
FIG. 2 is an enlarged top plan view of the engine, with a portion of the induction system broken away.

The intake camshaft 36 and exhaust camshaft 38 are driven by a chain or toothed belt 39 that is wound around a sprocket 41 affixed to the crankshaft 33 and respective sprockets 42 and 43 that are affixed to the intake and exhaust camshafts 36 and 37, respectively. A timing case 44, which is shown in phantom in FIG. 1 and in solid lines in FIG. 2, is affixed to the front of the engine for containing the cam driving mechanism. The camshafts 36 and 38 are also enclosed by means of a cam cover 45 that, is affixed to the top of the cylinder head 34.

Spark plugs 46 are carried by the cylinder head 34 and are accessible through openings in the cam cover 45. The spark plugs 46 are fired by a suitable ignition system.

The induction system for supplying the fuel air charge to the cylinder head intake ports 35 will now be described with respect to this embodiment in detail by particular reference to FIGS. 2 and 3 in addition to FIG. 1. This induction system is identified generally by the reference numeral 47 and is comprised of a plurality of individual first pipe sections, indicated by the reference numeral 48, which extend in a generally horizontal direction forwardly from the individual intake ports 35 toward the air inlet opening 26 of the engine compartment. The first pipe sections 48 terminate in right angle bent portions 49 that turn in a downward direction. The outlet ends of the sections 48 are attached by means of flanges 51 to the intake side of the cylinder head. The right angle sections 49 have, in turn, flanges 52 that form an attachment to a generally U shaped pipe section, indicated generally by the reference numeral 53.

The pipe section 53 has a generally vertically extending portion 54, a reentrant curved portion 55 and a further vertically extending section 56. It should be noted that the vertically extending sections 56 are staggered slightly rearwardly relative to the sections 54 as best shown in FIG. 2. At their upper ends, the sections 56 have flanges 52 that afford attachment to further flanges 52 formed integrally with the sections 48.

There is provided a longitudinally extending plenum chamber 59 which is formed integrally with the section 48 but which communicates with the section 48 only through the U shaped section 53. Neck portions 61 communicate the plenum chamber 59 with the individual vertically extending sections 56 of the U shaped pipes 53. A throttle body 62 is affixed to one end of the plenum chamber 59 and contains a throttle valve 63 for controlling the flow of air into the plenum chamber 59 and, accordingly, the speed of the engine. The throttle body 62 communicates with an air cleaner (not shown) through a connecting pipe 64.

Individual fuel injectors 65 are mounted in the pipe sections 48 adjacent the intake ports 35 and deliver a fuel charge thereto in a known manner.

Because of the fact that the manifold assembly 47 is formed from two parts, the part 48 including the plenum chamber 59 and the U shaped parts 53, which are connected along a common plane defined by the flanges 52, it can be conveniently formed in a very inexpensive manner. Also, it can be readily apparent that the length of the intake passages can easily be changed by changing the U shaped sections 53 from a long section, as shown in solid in FIG. 3, to a shorter section, as shown in phantom in this figure. This offers a greater degree of versatility.

In the embodiment thus far described, it should be noted that the plenum chamber 59, although integrally formed with the pipe section 48, is not obscured by it and also has a relatively low height. In the illustrated embodiment, the plenum chamber 59 is positioned below the top of the cam cover 45 of the associated engine. If desired, the plenum chamber 59 can be positioned at a somewhat higher elevation but still below the top of the engine 27. Such an arrangement is shown in the phantom line view of FIG. 3. Because of the orientation of the plenum chamber 59 and the fact that it is not obscured, the air flowing through the grill opening 26 can readily cool the plenum chamber 59 and the entire induction system and thus a high volumetric efficiency can be achieved.

Figure 3:
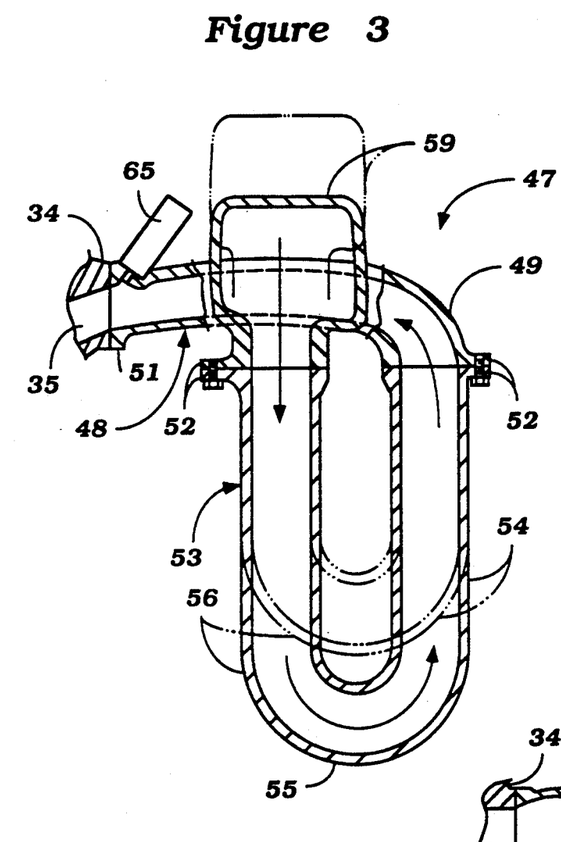
FIG. 3 is a cross sectional view taken generally along the line 3—3 of FIG. 2.
Figure 4:
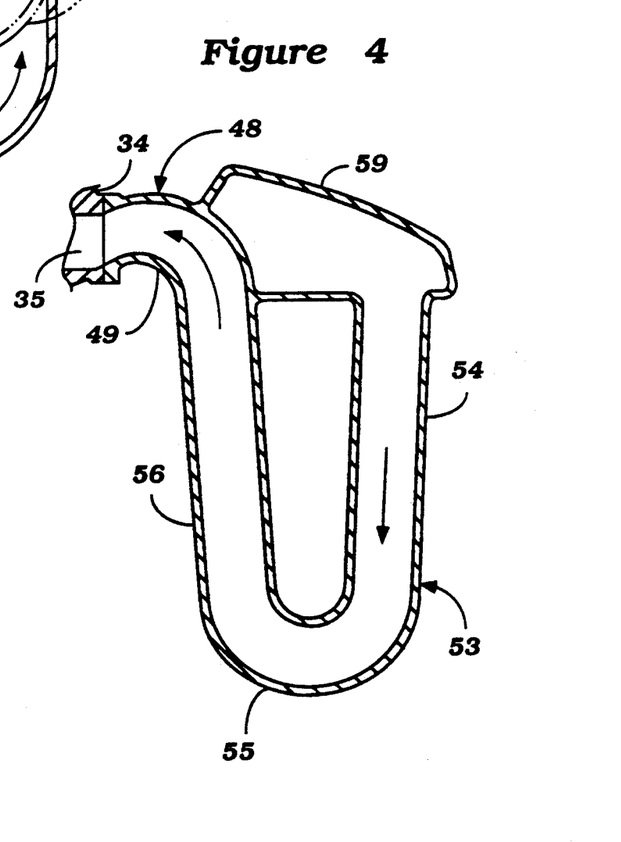
FIG. 4 is a cross sectional view, in part similar to FIG. 3, showing another embodiment of the invention.
Figure 5:
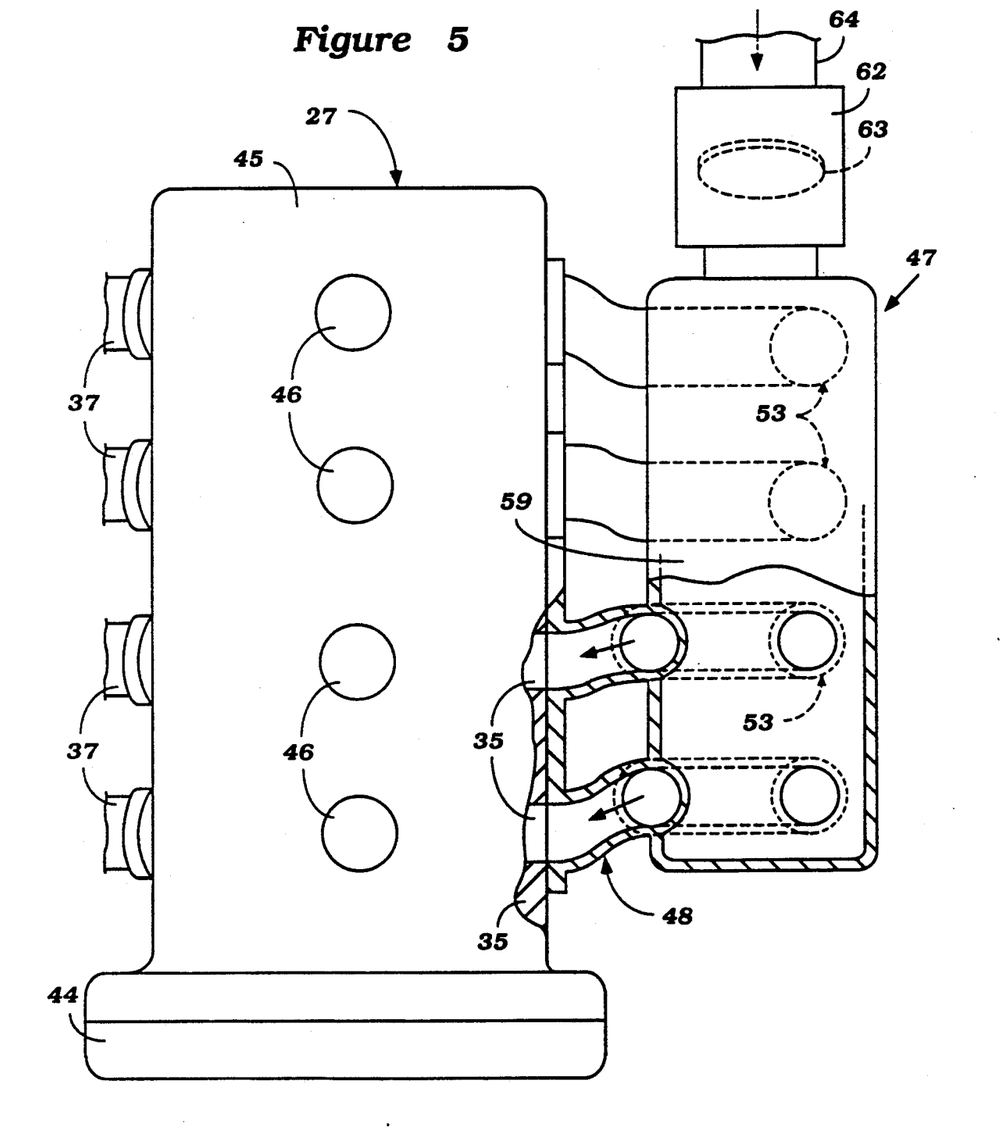
FIG. 5 is a top plan view, with portions broken away, of the embodiment of FIG. 4.

In the embodiment of FIGS. 1 through 3, the plenum chamber 59 was formed integrally with the pipe sections 48, but was positioned rearwardly from the right angle bent portions 49 in relation to the engine compartment 22. In addition, the plenum chamber 59, pipe section 48 and pipe section 53 were formed from two separate pieces. FIGS. 4 and 5 show another embodiment of the invention which is basically the same as the embodiment of FIGS. 1 through 3. In this embodiment, however, the plenum chamber 59 is formed forwardly of the right angle portion 49 of the pipe section 48 and the entire assembly is formed from a unitary casting. Because of the other similarities of this embodiment to the previously described embodiment, all components which are the same in function have been identified by the same reference numerals. Further description of this embodiment is believed to be unnecessary.

FIGS. 6 through 11 show another embodiment of the invention which is generally the same as the embodiment of FIGS. 1 through 3 and, for that reason, the elements of this embodiment which are substantially the same as those of the previously described embodiment have been identified generally by the same reference numerals. This embodiment, however, shows further details of the engine and the accessories driven by it and how the induction system can be tailored so as to clear the accessories and provide clearance without adversely effecting the performance. In this embodiment, there are further internal details of the engine shown and the engine is identified generally by the reference numeral 101 while the induction system is identified generally by the reference numeral 102.

Figure 7:
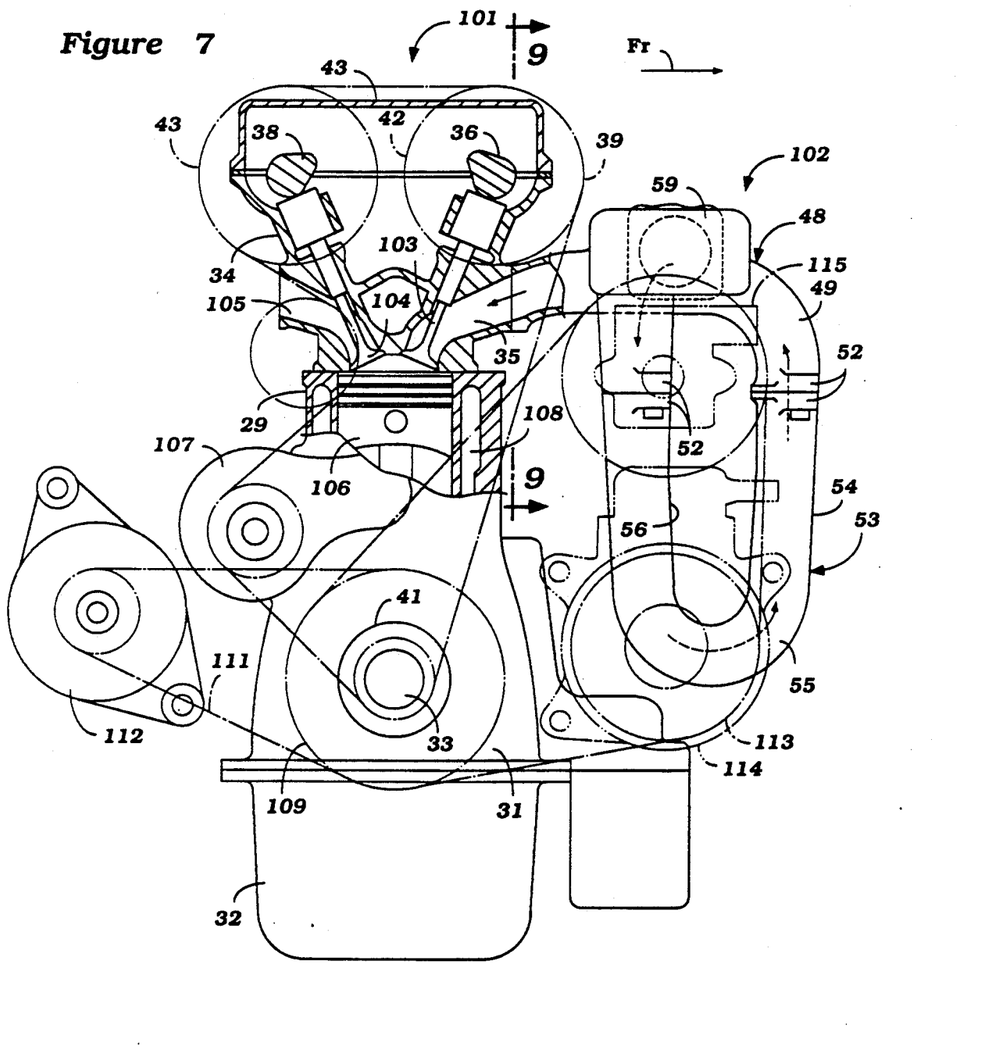
FIG. 7 is a front elevational view of this embodiment, with a portion broken away.
Figure 8:
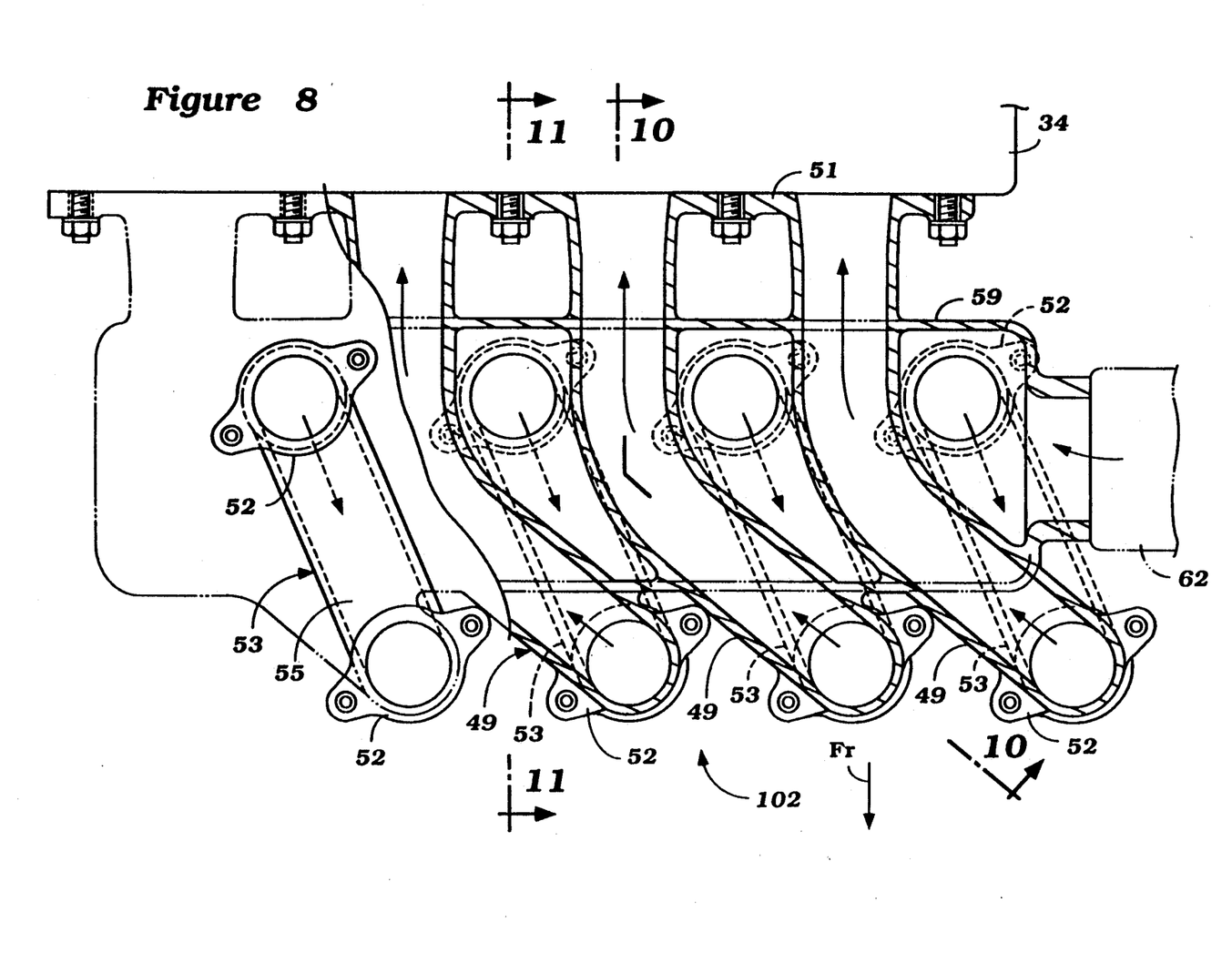
FIG. 8 is a cross sectional view taken along the line 8—8 of FIG. 6.
Figure 9:
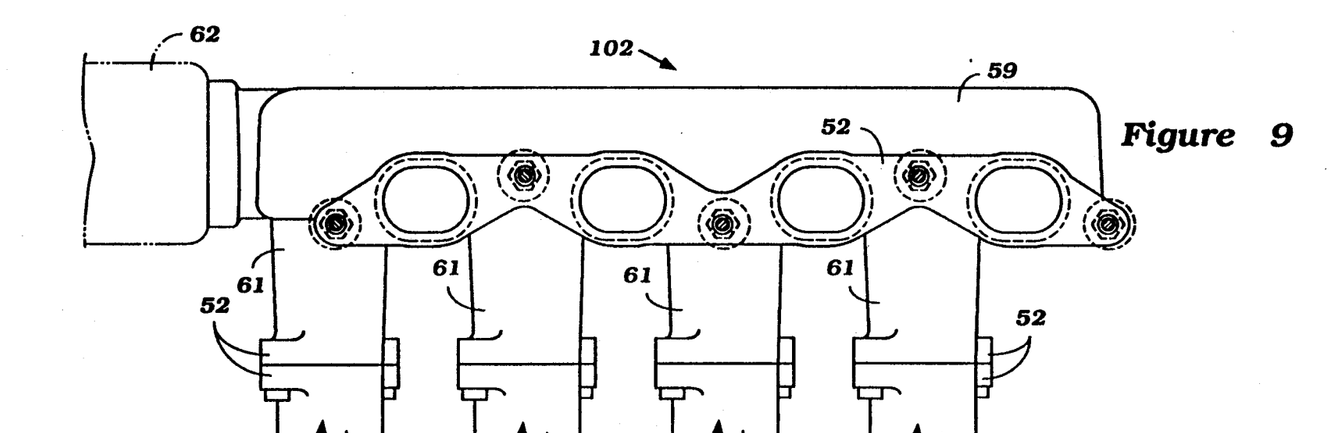
FIG. 9 is a side elevational view of the induction system looking in the opposite direction from FIG. 7.
Figure 10:
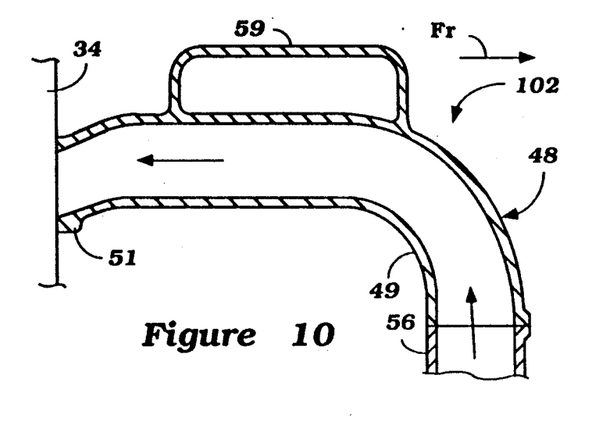
FIG. 10 is a cross sectional view taken along the line 10—10 of FIG. 8.
Figure 11:
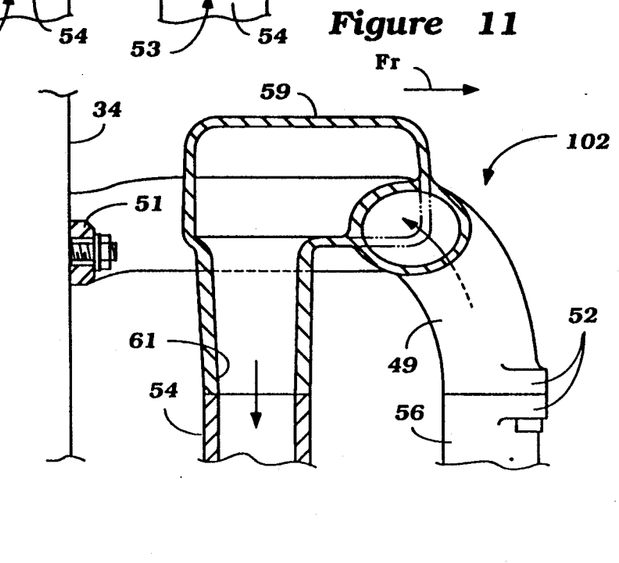
FIG. 11 is a cross sectional view taken along the line 11—11 of FIG. 8.

FIG. 7 shows a partial cross section of the engine. In this figure there can be seen the intake valves 103, exhaust valves 104 and exhaust ports 105. In addition, one of the pistons 106 is also illustrated. A water pump 107 is driven off the main timing belt 39 and supplies to a cooling jacket 108 of the engine 101 in a known manner.

Figure 6:
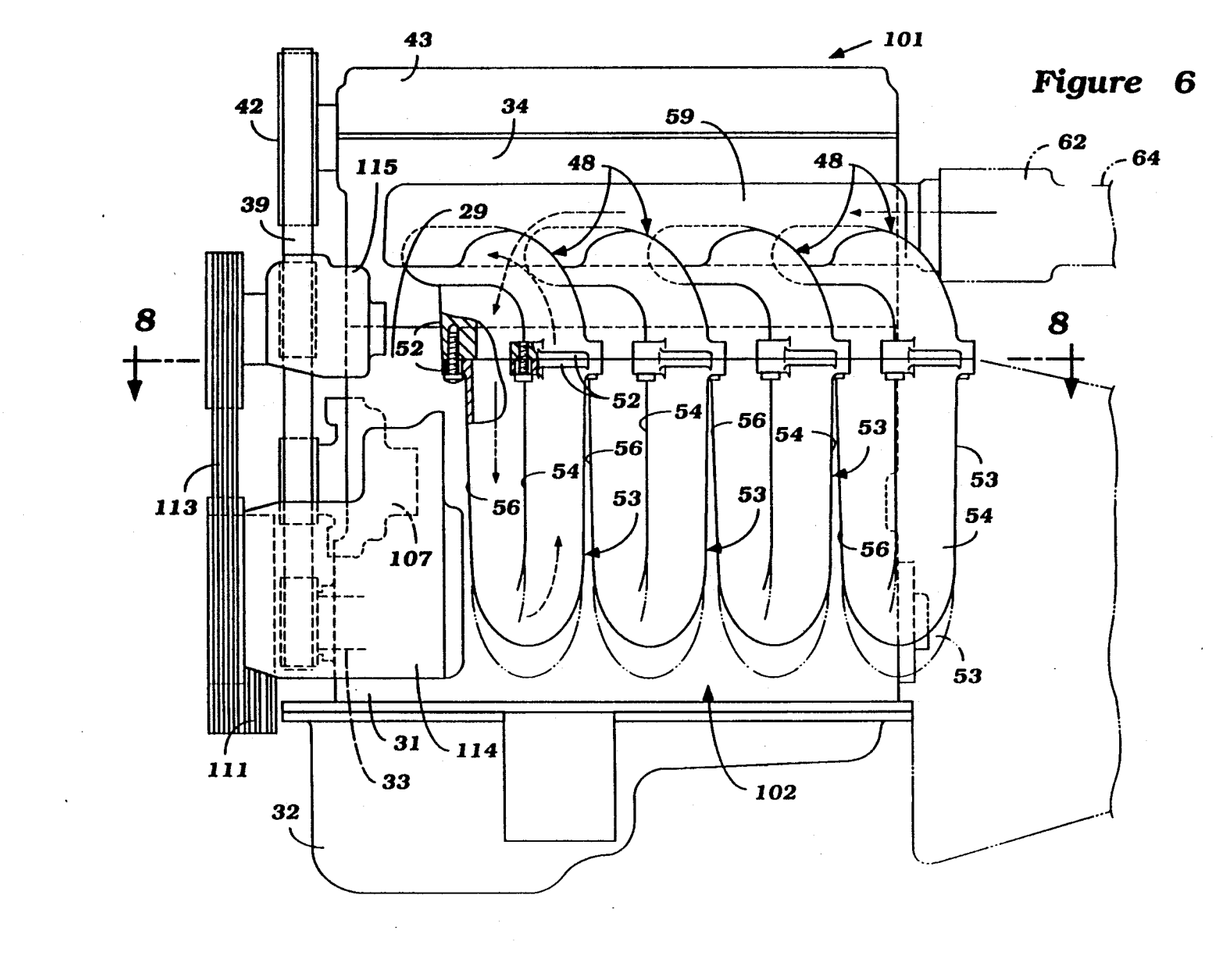
FIG. 6 is a side elevational view of an internal combustion engine constructed in accordance with yet another embodiment of the invention.

In addition to the sprocket 41 that drives the timing belt 39, there is connected to the crankshaft 33 a further sprocket 109 that drives an accessory drive belt 111 which drives further accessories such as an alternator or generator 112. A still further accessory drive belt 113 drives other accessories such as an air conditioning compressor 114 and an oil pump 115. These components are disposed as shown in FIGS. 6 and 7.

It will be noted that the oil pump 115 and air conditioning compressor 114 are disposed on the intake side of the engine and at the front of it. In order to provide clearance, therefore, the first pipe sections 48 emanate from the intake ports 35 and are angled rearwardly as may be best seen in FIGS. 6 and 8. As a result, the U shaped pipe sections 53 are positioned rearwardly of the engine and again are staggered so that the section 54 is disposed rearwardly of the section 56 to provide added clearance. Thus, it should be readily apparent that the arrangement offers all of the advantages of the previously described embodiments, including the two piece construction of the embodiment of FIGS. 1 through 3 and still further offers clearance for the accessories of the engine and other vehicle accessories driven by the engine.

It should be readily apparent from the forgoing description that the embodiments of the invention are particularly adapted at providing a very high efficiency induction system that has long intake runners but which can be tuned to varying lengths by replacing the U shaped pipe sections while still maintaining a compact assembly, one which is easily formed and one which offers ease of accessibility and clearance for the components. Although a number of embodiments of the invention have been illustrated and described, various changes and modifications may be made without departing from the spirit and scope of the invention, as defined by the appended claims.

We claim:

1. An induction system for an engine having a cylinder assembly having a plurality of aligned cylinders and a side surface defining a plurality of aligned intake ports facing in a first direction from said side surface, said induction system comprising a plurality of first pipe sections each extending from a respective one of said intake ports outwardly and terminating in a generally right angled portion, a plurality of second pipe sections having a generally U shaped configuration having first and second portions extending generally parallel to said side surface, said first portions of said second sections being spaced further from said side surface than said second portion and being in direct communication at its upper end to a respective one of said angle portions of a respective of said first pipe sections, and a common plenum chamber connected to and communicating with the upper end of each of said second portions of said second pipe sections for supplying intake air to each of said intake ports.

2. An induction system as set forth in claim 1 wherein the plenum chamber is formed integrally with the first pipe sections.

3. An induction system as set forth in claim 2 wherein the plenum chamber lies at least in part above the upper surface of the first pipe sections.

4. An induction system as set forth in claim 1 wherein the top of the plenum chamber lies below the top of the engine.

5. An induction system as set forth in claim 4 wherein the plenum chamber is formed integrally with the first pipe sections.

6. An induction system as set forth in claim 5 wherein the plenum chamber overlies at least in part the first pipe section.

7. An induction system as set forth in claim 5 wherein the plenum chamber is disposed closer to the side surface than the first portion of the second pipe section.

8. An induction system as set forth in claim 1 wherein the plenum chamber overlies at least in part the first pipe section.

9. An induction system as set forth in claim 8 wherein the plenum chamber is formed integrally with the first pipe sections.

10. An induction system as set forth in claim 1 wherein the plenum chamber is disposed closer to the side surface than the first portion of the second pipe section.

11. An induction system as set forth in claim 10 wherein the plenum chamber is formed integrally with the first pipe sections.

12. An induction system as set forth in claim 1 wherein the engine is positioned transversely in an engine compartment having an air inlet opening at one side of the engine.

13. An induction system as set forth in claim 2 wherein the second pipe section is an integral assembly.

14. An induction system as set forth in claim 13 wherein the second pipe section is detachably affixed to the first pipe section for replacement of the U shaped pipe section with sections of different lengths.

15. An induction system as set forth in claim 14 wherein the first and second pipe sections have mating surfaces connected to each other along a common plane.

16. An induction system as set forth in claim 1 wherein at least certain of the pipe sections are offset from one end of the engine so as to clear an accessory driven by the engine.

17. An induction system as set forth in claim 16 wherein the first pipe sections are offset from the intake ports they serve toward one end of the engine.

18. An induction system as set forth in claim 17 wherein the U shaped pipe sections have one portion positioned rearwardly of the other portion.

19. An induction system as set forth in claim 18 wherein the first pipe section and the plenum chamber are formed integrally with each other.

20. An induction system as set forth in claim 19 wherein the second pipe section is an integral assembly.

21. An induction system as set forth in claim 20 wherein the second pipe section is detachably affixed to the first pipe section for replacement of the U shaped pipe section with sections of different lengths.

22. An induction system as set forth in claim 21 wherein the first and second pipe sections have mating surfaces connected to each other along a common plane.

23. An induction system as set forth in claim 12 wherein the induction system is positioned between the air inlet opening and the remainder of the engine.

24. An induction system as set forth in claim 2 wherein the right angle portion of the first section turns downwardly, the second pipe section lies below the first pipe section.

25. An induction system as set forth in claim 24 wherein the plenum chamber lies at least in part above the upper surface of the first pipe sections.

26. An induction system as set forth in claim 25 wherein the top of the plenum chamber lies below the top of the engine.

27. An induction system as set forth in claim 26 wherein the plenum chamber overlies at least in part the first pipe section.

28. An induction system as set forth in claim 24 wherein the second pipe section is an integral assembly.

29. An induction system as set forth in claim 28 wherein the second pipe section is detachably affixed to the first pipe section for replacement of the U shaped pipe section with sections of different lengths.

30. An induction system as set forth in claim 29 wherein the first and second pipe sections having mating surfaces connected to each other about a common plane.

31. An induction system as set forth in claim 25 wherein the first pipe section and the plenum chamber are formed integrally with each other.

32. An induction system as set forth in claim 31 wherein the second pipe section is an integral assembly.

33. An induction system as set forth in claim 32 wherein the second pipe section is detachably affixed to the first pipe section for replacement of the U shaped pipe section with sections of different lengths.

34. An induction system as set forth in claim 33 wherein the first and second pipe sections having mating surfaces connected to each other along a common plane.

35. An induction system as set forth in claim 24 wherein at least certain of the pipe sections are offset to one end of the engine so as to clear an accessory driven by the engine.

36. An induction system as set forth in claim 35 wherein the first pipe sections are offset from the intake ports they serve toward one end of the engine.

37. An induction system as set forth in claim 36 wherein the U shaped pipe sections have one portion positioned rearwardly of the other portion.

38. An induction system as set forth in claim 37 wherein the first pipe section and the plenum chamber are formed integrally with each other.

39. An induction system for an engine having a plurality of aligned intake ports facing in a first direction, said induction system comprising a plurality of first pipe sections each extending from one of the respective intake ports outwardly and terminating in a generally right angled portion, a plurality of second pipe sections positioned beneath said first pipe sections and having a generally U shaped configuration, each of said second pipe sections being connected to and communicating at one end thereof to a respective one of said right angle portions of a respective of said first pipe sections, and a common plenum chamber integrally formed with said first pipe sections and connected to and communicating with the other end of each of said second pipe sections for supplying intake air to each of said intake ports.

40. An induction system as set forth in claim 39 wherein the plenum chamber lies at least in part above the upper surface of the first pipe sections.

41. An induction system as set forth in claim 40 wherein the top of the plenum chamber lies below the top of the engine.

42. An induction system as set forth in claim 39 wherein the second pipe section is an integral assembly.

43. An induction system as set forth in claim 42 wherein the second pipe section is detachably affixed to the first pipe section for replacement of the U shaped pipe section with sections of different lengths.

44. An induction system as set forth in claim 43 wherein the first and second pipe sections have mating surfaces connected to each other along a common plane.

* * * * *

UNITED STATES PATENT AND TRADEMARK OFFICE
CERTIFICATE OF CORRECTION

PATENT NO. : 5,074,257

DATED : December 24, 1991

INVENTOR(S) : Amano, et al

It is certified that error appears in the above-identified patent and that said Letters Patent is hereby corrected as shown below:

Column 7, line 37, Claim 31, "25" should be --24--.

Signed and Sealed this

Seventeenth Day of August, 1993

Attest:

BRUCE LEHMAN

*Attesting Officer*      *Commissioner of Patents and Trademarks*